(12) United States Patent
Chakrabarty et al.

(10) Patent No.: US 11,614,934 B1
(45) Date of Patent: Mar. 28, 2023

(54) MONOLITHIC COMPUTER APPLICATION REFACTORING

(71) Applicant: INTERNATIONAL BUSINESS MACHINES CORPORATION, Armonk, NY (US)

(72) Inventors: Santanu Chakrabarty, Bangalore (IN); Sivaraj Sethunamasivayam, Bangalore (IN); Shoaib Khan, Bangalore (IN); Greeshma Vidyadharan Thottingal, Bengaluru (IN); Sivaranjani Kathirvel, Dharapuram TK (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/534,808

(22) Filed: Nov. 24, 2021

(51) Int. Cl.
*G06F 8/72* (2018.01)
*G06N 3/02* (2006.01)
*G06F 8/75* (2018.01)

(52) U.S. Cl.
CPC .............. *G06F 8/72* (2013.01); *G06F 8/75* (2013.01); *G06N 3/02* (2013.01)

(58) Field of Classification Search
CPC ................................. G06N 3/02; G06F 8/75
See application file for complete search history.

(56) References Cited

U.S. PATENT DOCUMENTS

| | | | |
|---|---|---|---|
| 10,389,602 B2 | 8/2019 | Chang et al. | |
| 10,430,250 B2 | 10/2019 | Ishikawa et al. | |

(Continued)

FOREIGN PATENT DOCUMENTS

| | | |
|---|---|---|
| CN | 107005801 A | 8/2017 |
| CN | 111345052 A | 6/2020 |

(Continued)

OTHER PUBLICATIONS

Axelsson et al., "Extracting Microservices from a Monolithic Application" (Year: 2019).*

(Continued)

*Primary Examiner* — Phillip H Nguyen
(74) *Attorney, Agent, or Firm* — Cuenot, Forsythe & Kim, LLC

(57) ABSTRACT

Refactoring a monolithic computer application can include transforming textual input into context-aware tokens represented by machine-processable data structures, the textual input acquired from multiple sources of text associated with a computer application having a monolithic architecture for implementing one or more application processes. Based on co-occurrence frequencies among the context aware tokens, one or more groupings of context-aware tokens can be determined. An association between each grouping and a code construct can be determined. Invocation sequences based on time series analyses of computer-generated usage data generated in response to execution of the one or more application processes can be generated, each invocation sequence linking two or more code constructs based on a time series analysis linking groupings that correspond to the linked code constructs. A recommendation for refactoring the computer application into a plurality of microservices can be generated, each microservice corresponding to one or more invocation sequences.

20 Claims, 7 Drawing Sheets

(56) References Cited

U.S. PATENT DOCUMENTS

| | | |
|---|---|---|
| 10,579,370 B2 | 3/2020 | Gupta |
| 10,620,947 B2 | 4/2020 | Gavisiddappa Kodigenahalli et al. |
| 10,637,952 B1 | 4/2020 | Koenig et al. |
| 10,713,664 B1 * | 7/2020 | Alagappan ............ G06Q 30/018 |
| 10,936,291 B1 * | 3/2021 | Gamliel ..................... G06F 8/72 |
| 11,354,120 B1 * | 6/2022 | Zhang ....................... G06F 8/72 |
| 11,442,725 B1 * | 9/2022 | Chawda ..................... G06F 8/60 |
| 2005/0138603 A1 | 6/2005 | Cha et al. |
| 2016/0183064 A1 | 6/2016 | Wouhaybi |
| 2017/0364434 A1 | 12/2017 | Kairali et al. |
| 2018/0287883 A1 | 10/2018 | Joshi et al. |
| 2018/0365008 A1 | 12/2018 | Chandramouli et al. |
| 2019/0250912 A1 * | 8/2019 | Gavisiddappa Kodigenahalli ...... G06F 8/20 |
| 2020/0387356 A1 | 12/2020 | Davis et al. |
| 2020/0401386 A1 | 12/2020 | Punathil et al. |
| 2021/0029001 A1 * | 1/2021 | Sen ......................... G06F 8/433 |
| 2021/0142159 A1 * | 5/2021 | Gupta .................. G06N 3/0445 |
| 2021/0149668 A1 | 5/2021 | Gupta et al. |
| 2021/0176637 A1 | 6/2021 | Flynn, IV et al. |

FOREIGN PATENT DOCUMENTS

| | | |
|---|---|---|
| EP | 3235272 A1 | 10/2017 |
| EP | 3729848 A1 | 10/2020 |

OTHER PUBLICATIONS

Mell, P. et al., The NIST Definition of Cloud Computing, National Institute of Standards and Technology, U.S. Dept of Commerce, Special Publication 800-145, Sep. 2011, 7 pg.

"Method and System for Digital Twin Simulation Based Identifying Microservice Architecture," [online] IP.com Prior Art Database Technical Disclosure, No. IPCOM000264992D, Feb. 15, 2021, 6 pg.

Srinivas, M. et al., "Analysis of Legacy System in Software Application Development: A Comparative Survey," In Int'l Journal of Electrical and Computer Engineering (IJECE), vol. 6, No. 1, Feb. 2016, pp. 292-297.

WIPO Appln. No. PCT/CN2022/13907, International Search Report and Written Opinion, dated Jan. 28, 2023, 9 pg.

\* cited by examiner

200

```
┌─────────────────────────────────────────────────────────────────────┐
│ Transform textual input into a plurality of context-aware tokens    │
│ represented by machine-processable data structures, the textual     │
│ input acquired from multiple sources of text associated with a      │
│ computer application having a monolithic architecture for           │
│ implementing one or more application process                        │
│                              202                                    │
└─────────────────────────────────────────────────────────────────────┘
                                  │
                                  ▼
┌─────────────────────────────────────────────────────────────────────┐
│ Determine one or more groupings of context-aware tokens based on    │
│ co-occurrence frequencies among the context aware tokens            │
│                              204                                    │
└─────────────────────────────────────────────────────────────────────┘
                                  │
                                  ▼
┌─────────────────────────────────────────────────────────────────────┐
│ Determine an association between each grouping and one or more      │
│ code contructs corresponding to the one or more application         │
│ processes                                                           │
│                              206                                    │
└─────────────────────────────────────────────────────────────────────┘
                                  │
                                  ▼
┌─────────────────────────────────────────────────────────────────────┐
│ For each of the application processes, generate one or more         │
│ invocation sequences based on time series of computer-generated     │
│ usage data generated in response to execution of the one or more    │
│ application processes, each invocation sequence linking two or more │
│ code constructs based on a time series linking groupings that       │
│ correspond to the two or more code constructs                       │
│                              208                                    │
└─────────────────────────────────────────────────────────────────────┘
                                  │
                                  ▼
┌─────────────────────────────────────────────────────────────────────┐
│ Generate a recommendation for refactoring the computer application  │
│ into a plurality of microservices, wherein each microservice        │
│ corresponds to one or more invocation sequences                     │
│                              210                                    │
└─────────────────────────────────────────────────────────────────────┘
```

FIG. 2

MONOLITHIC COMPUTER APPLICATION REFACTORING

TECHNICAL FIELD

This disclosure relates generally to computer applications, and more particularly, to refactoring monolithic computer applications.

BACKGROUND

A monolithic computer application is built as a single, indivisible unit, often comprising a client-side user interface, a server-side application, and database. Over time there may be demands to "grow" a computer application to encompass additional or modified processes. A monolithic architecture, however, can limit the computer application's scalability and flexibility for accommodating such changes. The limitations of a monolithic architecture can impede incorporation of new technologies, limit scalability, necessitate redeployment of the entire application with each update, and involve extensive testing of a large software base following code construct modifications—obstacles that to a considerable extent are overcome by building a computer application using microservices as the building blocks.

SUMMARY

In one or more embodiments, a computer-implemented method of refactoring a monolithic computer application can include transforming textual input into a plurality of context-aware tokens represented by machine-processable data structures. The textual input can be acquired from multiple sources of text associated with a computer application having a monolithic architecture for implementing one or more application processes. The method can include determining, based on co-occurrence frequencies among the context aware tokens, one or more groupings of context-aware tokens and determining an association between each of the one or more groupings and one or more code constructs. The method can include generating invocation sequences based on time series of computer-generated usage data generated in response to execution of the one or more application processes, each invocation sequence linking two or more code constructs based on a time series linking groupings that correspond to the two or more code constructs. The method can include generating a recommendation for refactoring the computer application into a plurality of microservices, each microservice corresponding to one or more invocation sequences.

In one or more embodiments, a system for refactoring a monolithic computer application includes a processor configured to initiate operations. The operations can include transforming textual input into a plurality of context-aware tokens represented by machine-processable data structures. The textual input can be acquired from multiple sources of text associated with a computer application having a monolithic architecture for implementing one or more application processes. The operations can include determining, based on co-occurrence frequencies among the context aware tokens, one or more groupings of context-aware tokens and determining an association between each of the one or more groupings and one or more code constructs. The operations can include generating invocation sequences based on time series of computer-generated usage data generated in response to execution of the one or more application processes, each invocation sequence linking two or more code constructs based on a time series linking groupings that correspond to the two or more code constructs. The operations can include generating a recommendation for refactoring the computer application into a plurality of microservices, each microservice corresponding to one or more invocation sequences.

In one or more embodiments, a computer program product includes one or more computer readable storage media having instructions stored thereon. The instructions are executable by a processor to initiate operations. The operations can include transforming textual input into a plurality of context-aware tokens represented by machine-processable data structures. The textual input can be acquired from multiple sources of text associated with a computer application having a monolithic architecture for implementing one or more application processes. The operations can include determining, based on co-occurrence frequencies among the context aware tokens, one or more groupings of context-aware tokens and determining an association between each of the one or more groupings and one or more code constructs. The operations can include generating invocation sequences based on time series of computer-generated usage data generated in response to execution of the one or more application processes, each invocation sequence linking two or more code constructs based on a time series linking groupings that correspond to the two or more code constructs. The operations can include generating a recommendation for refactoring the computer application into a plurality of microservices, each microservice corresponding to one or more invocation sequences.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example method of refactoring a monolithic computer application implemented with the system of FIG. 1.

DETAILED DESCRIPTION

Figure 1:
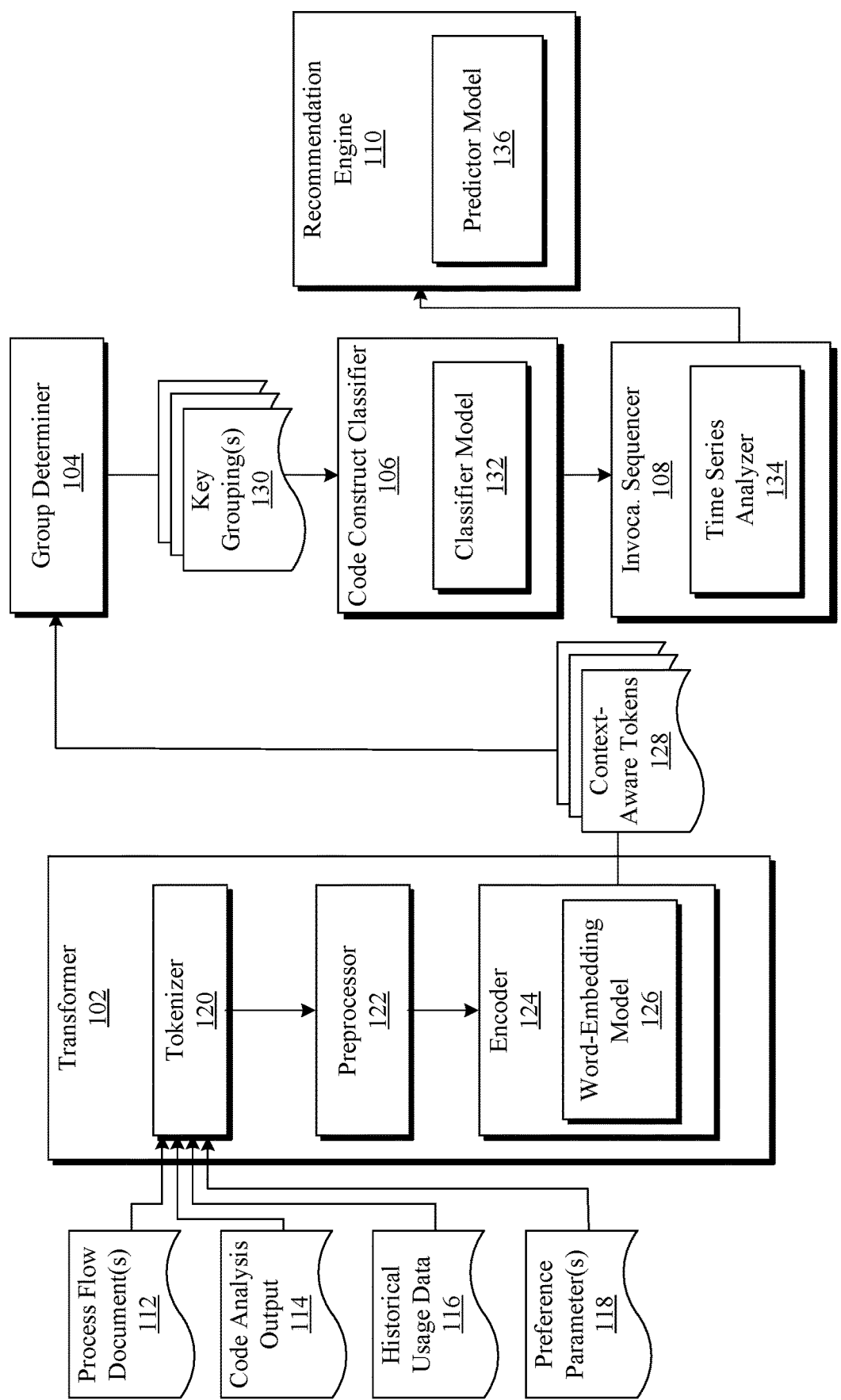
FIG. 1 illustrates an example computer application refactoring and recommendation system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates generally to computer applications, and more particularly, to refactoring monolithic computer applications. Monolithic computer applications can be of many varied types. For example, a monolithic computer application can be an enterprise application used by an enterprise such as a business, governmental entity, non-governmental organization, university, or any of a host of other organizations. In such diverse fields as banking, healthcare, and travel, for example, monolithic computer applications implement various distinct processes. The processes implemented by the monolithic computer application can handle complex information flows, support reporting functions, perform data analytics, or perform any number of complex functions for the organization. Various types of interactive processes, for example, facilitate making financial transactions, travel reservations, and a host of other functions.

As noted above, however, a monolithic architecture limits an application's scalability and flexibility for accommodating new technologies and incorporating new structures for new processes. Thus, a reason for refactoring a monolithic computer application is to restructure the computer application as an aggregation of interoperable microservices. A monolithic computer application is refactored by changing the underlying software (or code constructs) of the application while preserving the application's ability to implement the same processes that the application was originally intended to perform. As used herein, "refactoring" means restructuring a monolithic computer application by splitting the application into two or more constituent parts referred to as microservices.

The more extensive and/or complex a monolithic computer application is, the more extensive and varied the application's code constructs are likely to be. As used herein, "code construct" means one or more instructions of a computer program, whether expressed in executable form such as object code, source code, or other intermediate format, for performing one or more specific computer processing functions, routines, or operations. A code construct can correspond to the specific syntax and semantics of a particular computer language and can embody a specific processing concept. As used herein, "concept" means the purpose or objective of a process and the specific approach or manner of performing functions or operations to achieve the objective.

Conventional techniques of refactoring a monolithic computer application often involve significant manual effort on the part of software engineers and programmers. The level of experience and expertise these individuals need to accomplish the varied tasks of refactoring can be considerable. Unless performed by individuals having sufficient expertise and experience, the refactoring results are likely to be sub-optimal. Even if performed with the requisite skills, the refactoring may not produce an optimal mix of microservices. Moreover, regardless of the outcome, manually refactoring a monolithic computer application into multiple microservices can be a difficult, time-consuming task.

In accordance with the inventive arrangements described within this disclosure, example methods, systems, and computer program products are provided that are capable of automating the process of refactoring a monolithic computer application into microservices. The automated refactoring uses natural language processing (NLP) and machine learning models to identify the intended objectives of a monolithic computer application's processes, match the objectives with specific code constructs, and recommend invocation sequences of code constructs for creating microservices that perform the identified processes.

An aspect of the inventive arrangements disclosed herein is the leveraging of code analysis outputs, computer-generated usage data (e.g., operating system logs), software product documentation, and various meta information associated with the monolithic computer application to identify processes of the monolithic computer application and to refactor the application into microservices that effectively and efficiently implement the identified processes. The varied sources of information provide inputs to machine learning models trained to predict, based on the information, distinct code constructs and to discover latent processing patterns for creating invocation sequences linking the code constructs. The linked code constructs correspond to microservices that perform different processes implemented by the monolithic computer application. Based on the predictions, recommendations can be generated and ranked for refactoring a monolithic computer application into individual microservices.

With many monolithic computer applications, the applications' code constructs tend to be standardized. The same code construct can be used as a component in different processes by different monolithic computer applications. Accordingly, it can be difficult to discern the underlying concept of a process of a monolithic computer application looking only at the underlying code constructs of an application. An aspect of the inventive arrangements disclosed herein is the ability to identify the objective of a process based on unstructured data using NLP and machine learning, where the unstructured data is obtained from various different sources. Using NLP in conjunction with machine learning, the likely intent of each process of a monolithic computer application is identified and linked to specific code constructs—code constructs that can be linked through invocation sequencing—in refactoring the monolithic computer application into microservices that implement the application's different processes.

In certain arrangements disclosed herein, a system performs NLP using a word-embedding model (e.g., opensource Embedding Language Model (ELMo)) trained over a global corpus of words and coupled with Long Short-Term Memory (LSTM) recurrent neural network (RNN) models to determine groups of key topics or concepts from the varied sources of data and to associate the key topics with specific code constructs. Based on system usage data (e.g., system-generated logs) generated in response to the execution of one or more of the monolithic computer application's processes, latent usage patterns are discovered by the system using time series analysis (e.g., autocorrelation and/or serial correlation). Based on recognized usage patterns, the system determines invocation sequences linking various code constructs. The system can recommend different invocation sequences as microservices for refactoring the monolithic computer application. The system can recommend code constructs for microservices, database management, and transaction interfaces between microservices.

The inventive arrangements disclosed herein are an improvement over various existing techniques for refactoring monolithic computer applications. Rather than requiring detailed manual effort by highly experienced and skilled engineers and programmers, the arrangements disclosed herein provide automated mechanisms for identifying likely code constructs to implement specific processes. Using machine learning, expertise and experience acquired overtime can be incorporated in machine learning models and leveraged for each new refactoring task without the need for manual effort or specific skills of any individual. Refactoring—essentially now an automated process—can be performed more accurately as well as more efficiently through the leveraging of NLP and machine learning.

Further aspects of the inventive arrangements described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 5:
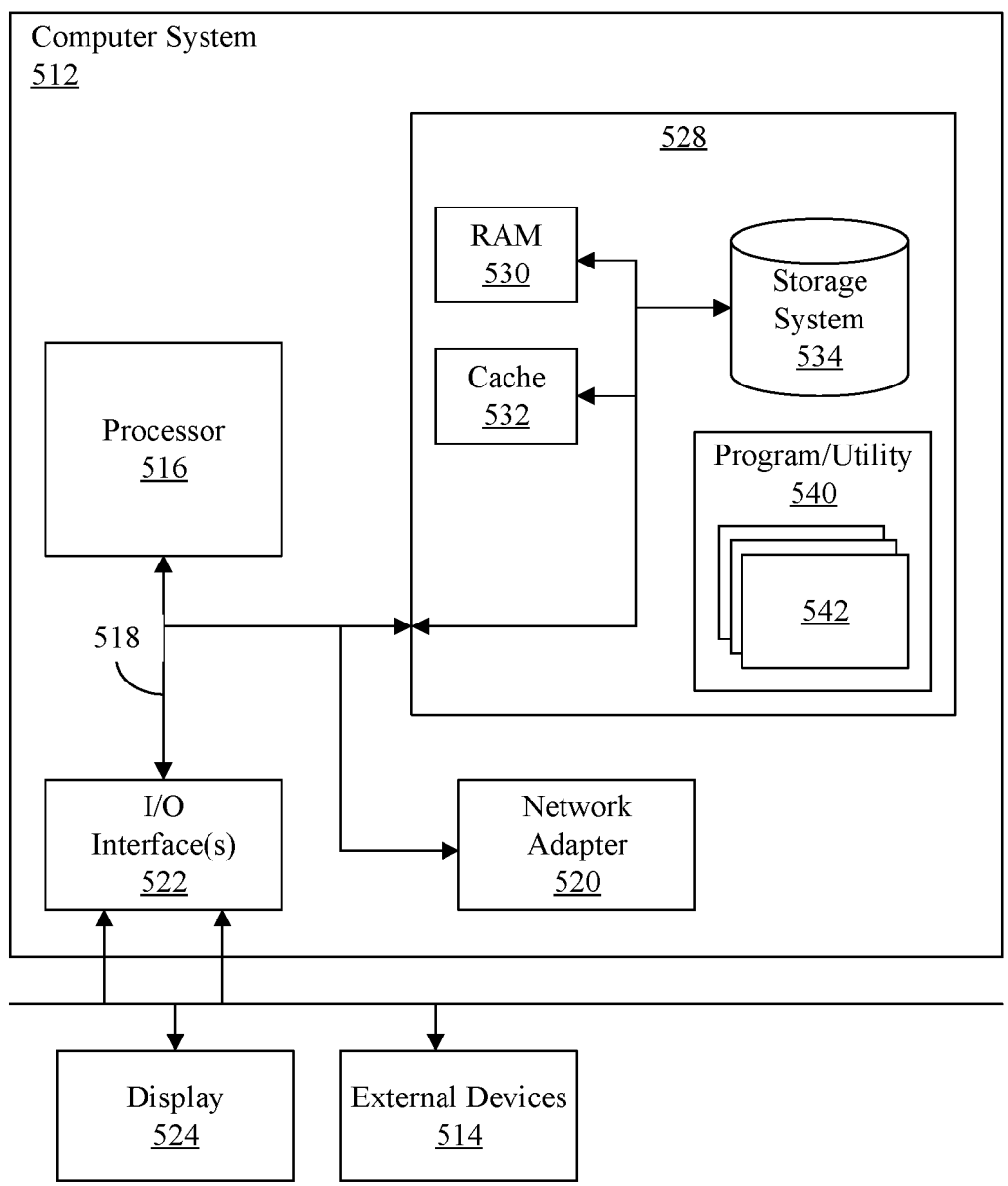
FIG. 5 illustrates an example of a computing node.

Referring initially to FIGS. 1 and 2, example refactoring and recommendation system (system) 100 is illustrated in FIG. 1, and example refactoring and recommendation method 200 implemented by system 100 is illustrated in FIG. 2. System 100 illustratively includes transformer 102, group determiner 104, code construct classifier 106, invocation sequencer 108, and recommendation engine 110. In various embodiments, transformer 102, group determiner 104, code construct classifier 106, invocation sequencer 108, and recommendation engine 110 of system 100 can be implemented in hardware (e.g., dedicated hardwired circuitry), software (e.g., program code executed by one or more processors), or a combination thereof. For example, system 100 in certain embodiments is implemented in a computing node, such as computing node 500 (e.g., cloud-based server), in which system 100 comprises program code that is electronically stored in a memory, such as memory 528, and executes on one or more processors, such as processor 516 of computer system 512 (FIG. 5).

At block 202, transformer 102 is capable of transforming textual input into a plurality of context-aware tokens represented by machine-processable data structures. As machine-processable data structures, system 100 uses the textual input to generate refactoring recommendations using NLP in conjunction with classifications and predictions by machine learning models (e.g., deep learning neural networks). The textual input is associated with a specific computer application having a monolithic architecture for implementing one or more application processes. System 100 can acquire the textual input from multiple sources, including for example software documentation, process flow documents, API documents and descriptions, monolithic database mappings, and the like, as well as the underlying processor-executable code of the monolithic computer application and code analyzer output. The code analyzer output, in various arrangements, can be generated by a static code analyzer that analyzes the monolithic computer application's source code without executing the code.

Illustratively, the textual input includes one or more process flow documents 112, text-based code analysis output 114 generated by a code analyzer (not shown), and historical usage data 116. Historical usage data can include method call flows and other data (e.g., operating system log files) indicating, for example, the frequency and timing of the real-time execution of various monolithic computer application processes executing over a predetermined time span. The textual input optionally also includes one or more preference parameters 118, the role of which are described below.

Transformer 102 illustratively includes tokenizer 120, preprocessor 122, and encoder 124. Tokenizer 120 tokenizes the textual input, and pre-processor 122 performs various preprocessing procedures, including word lemmatization and stemming. Transformer 102 transforms tokenized and preprocessed textual input into a multidimensional array (e.g., N×N matrix or higher dimension tensor) that is encoded by encoder 124. Encoder 124 implements word-embedding model 126, which is trained over a global corpus of words using a predefined language-modeling objective function. In certain arrangements, word-embedding model 126 sequentially converts each of tokenized words 126 to a context-independent embedding using a convolutional neural network (CNN), each of which in turn is fed into a two-layer LSTM RNN. Output of second layer forward and backward LSTMs are fed to a soft-max layer to predict co-occurrences among tokenized words. Iterative application of word-embedding model 126 can generate context-aware tokens 128, the semantics of which can be probabilistically determined based on terms that frequently co-occur in sentences or phrases before and/or after each context-aware token.

Each context-aware token can be represented as a vector generated as a result of word-embedding to correspond to the specific semantics of the word represented. Similar words correspond to closely aligned vectors in an n-dimensional vector space, where n corresponds to the number of unique words of the textual input. Each vector can be indexed, and a time dimension added to each vector by transformer 102. The index can be used to determine the frequency of occurrence for each vector representation of a context-aware token based on historical usage data (e.g., system calls) acquired over a predetermined time span. Based on a predetermined threshold of occurrence, transformer 102 can determine one or more context-aware tokens that correspond to a key topic or focus word. Other context-aware tokens, which frequently occur in conjunction with a key topic or focus word, are identified by transformer 102 as corresponding to context words. In certain arrangements, transformer 102 generates a first matrix of tokens corresponding to the focus words and a second matrix of tokens corresponding to the context words.

At block 204, group determiner 104 is capable of determining one or more groupings of context-aware tokens. As described below, the groupings are determined based on the statistical coherence among various ones of the context-aware tokens. Using one or machine learning models also described below, the groupings are associated with distinct code constructs from which microservices can be constructed. Group determiner 104 can determine the one or more groupings 130 of context-aware tokens based on co-occurrence frequencies among context-aware tokens 128. In certain arrangements, the co-occurrences are determined from a co-occurrence matrix generated by combining the first and second matrices generated by transformer 102. The co-occurrence matrix, for example, can contain an element in each row that corresponds to a context-aware token representing a focus word and each remaining row element can correspond to a context word associated with the focus word.

At block 206, code construct determiner 106 is capable of determining an association associating each group with one or more code constructs. Each group comprises statistically related context-aware tokens. Code construct determiner 106 implements classifier model 132 for associating each group with one or more code constructs. Classifier model 132 can be a machine learning model (e.g., deep learning neural network) trained through supervised learning based on a set of labeled training examples to classify context-aware tokens (or vector representations of words), each classification corresponding to a distinct code construct. As input to classifier model 132, each group can be represented by a multidimensional array (e.g., vector, matrix, or higher dimension tensor) that the machine learning model is trained to classify, each classification indicating an association between a group and a code construct. Thus, each classification made by classifier model 132 corresponds to a code construct. Each code construct corresponds a portion executable code of the monolithic computer application, the executable code identified from the code analysis output 114 performed by a code analyzer and included among the textual input to system 100.

At block 208, invocation sequencer 108 is capable of generating one or more invocation sequences. Invocation sequences link code constructs that when executed according to the ordering determined by invocation sequencer 108 implement a corresponding process implemented by the monolithic computer application. Invocation sequencer 108 illustratively includes time series analyzer 134. Time series analyzer 134 analyzes historical usage data 116 to discover through statistical analysis of time-based events (e.g., API calls) groups (of context-aware tokens) that co-occur frequently. Given the association between groups and corresponding code constructs, the discovery of groups that occur regularly in a specific order provides an indication of an ordering of multiple code constructs that perform operations and functions for implementing a corresponding process of the monolithic computer application. Each sequence of time-based events can be analyzed as a realization or outcome of an underlying stochastic process. Implementing time series analysis such as serial correlation and autocorrelation, time series analyzer 134 can identify which of the identified code constructs occur frequently and in what order relative to other of the identified code constructs, thereby determining process flows that correspond to processes implemented by the monolithic computer application.

Each time series acquired over a predetermined time span provides a statistically based representation of a sequence of code constructs identified by the classifier model 132 from corresponding groups. Invocation sequencer 108, by transposing time series data, provides a distributed probability score for each context-aware token (word) occurring within a preceding and succeeding set of context-aware tokens. Spreading this probability score set over the predetermined time span determines a likelihood that a sequence of code constructs duplicates or performs a particular process of the monolithic computer application, and accordingly, is a candidate microservice for refactoring the monolithic computer application.

At block 210, recommendation engine 110 is capable of generating a recommendation for refactoring the monolithic computer application. The recommendation is based on the invocation sequences, each of which as noted comprises an ordered arrangement for executing code constructs that perform the application processes of the monolithic computer application. Based on the time series-based statistical analysis of the frequency of context-aware tokens taken over a predetermined time span, recommendation engine 110 determines which invocation sequences are used more frequently. The more frequently a specific invocation sequence is used, the greater the probability that the invocation sequence optimally implements the objective of a process associated with an identified group. Recommendation engine 110 generates recommendations based on the probabilities.

Figure 3:
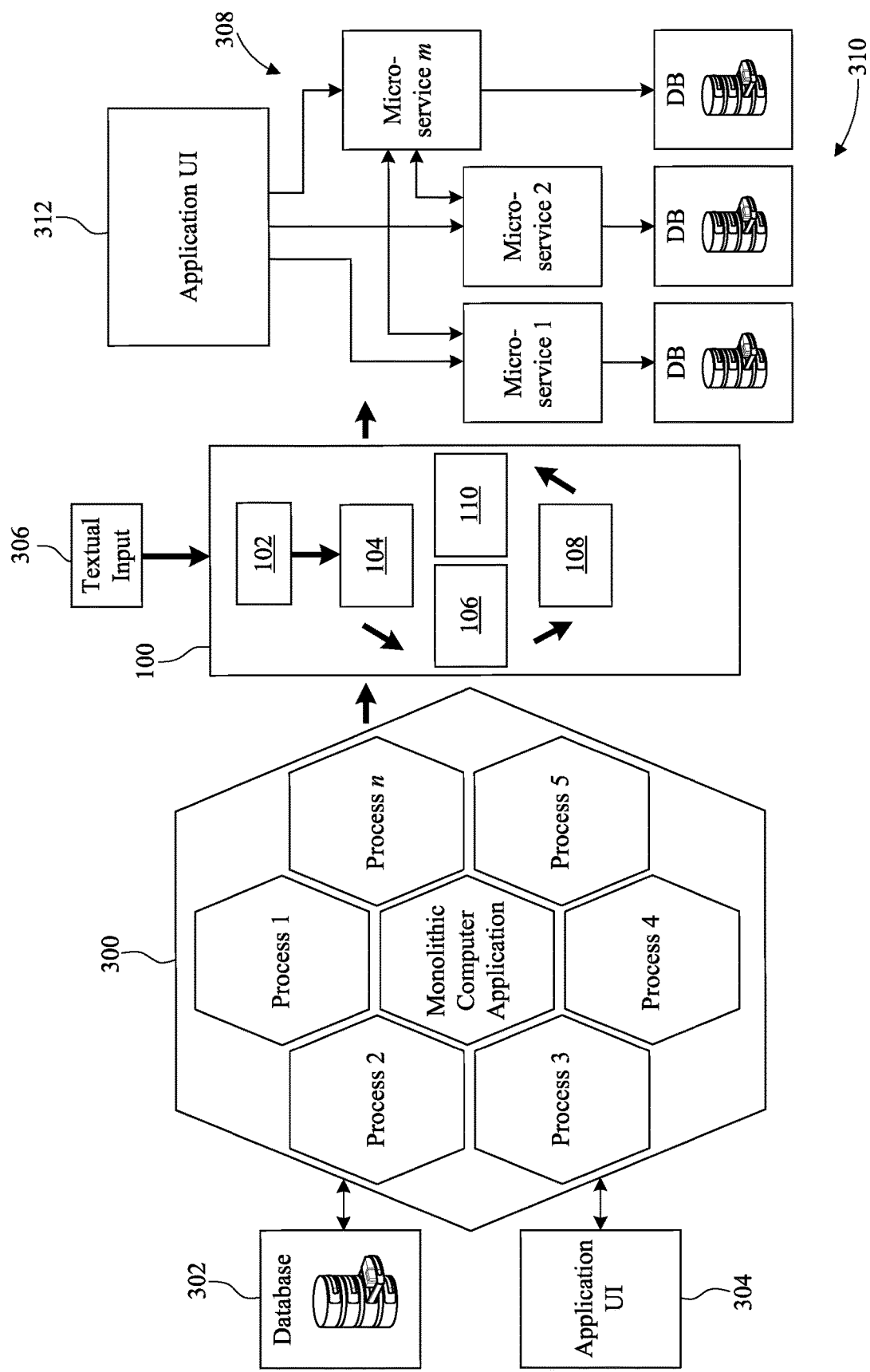
FIG. 3 illustrates certain operative features of the system of FIG. 1.

Referring now to FIG. 3, certain operative aspects of system 100 are illustrated schematically in the context of refactoring example monolithic computer application 300. Monolithic computer application 300 illustratively includes processes 1 through n, where n is any integer. The n processes map to one or more databases 302. Various clients can interact with processes 1 though n via one or more application user interfaces (UIs) 304. In addition to software code for implementing processes 1 through n, system 100 illustratively acquires various textual input 306 (e.g., process flow documents, code analyzer output, meta data, preference parameters).

Operatively, transformer 102 tokenizes each record set (e.g., based on sentence length) extracted from textual input 306, which collectively can comprise curated datasets, and performs preprocessing (e.g., lemmatization, stemming). Transformer 102 transforms textual input 306 into a word-array (e.g., N×N matrix) and encodes the array elements by converting words to numerical values using a pre-trained word-embedding model, such as word-embedding model 126 (FIG. 1). Word embedding generates context-aware tokens used by the other elements of system 100, as described above.

The word-embedding model (e.g., ELMo, BERT) can be trained across a global corpus of textual data. Each element of a row of the now-encoded array can correspond to a probability. For example, the i-row may correspond to a three-word sentence or phrase, which is represented by the data structure Term i=[0.2 0.4 0.6], where the first element is the probability that a word corresponding to that element occurs, and where the second and third elements, respectively, are the probabilities that the first word is followed by the words corresponding to the second and their elements of the row vector.

As already noted, the word embedding can be performed using an LSTM RNN, which can expand tokenized textual input 306 into vector representations. Machine-processable vectors are passed to the LSTM, which processes a sequence of vectors, one-by-one, passing each to the next hidden layer, and calculates probability scores. The probability scores corresponding to which terms (e.g., term i, above) influence, and to what extent, other terms. Based on the probability scores, the array can be pared down to an array (e.g., n×m matrix) of focus words, represented by the context-aware tokens.

Context-aware tokens representing the focus words and those frequently occurring in conjunction (in a probabilistic sense) therewith are indicated by co-occurrence frequencies, from which groupings are determined by group determiner 104. Code construct classifier 106 determines an association between each grouping and one or more code constructs of monolithic computer application 300 by classifying the composition (context-aware tokens) of each grouping. Classifying the groupings is done by code construct classifier 106 using a classifier model, such as classifier model 132 (FIG. 1). The classifier model of code construct classifier 106 is a machine learning model (e.g., deep learning neural network) trained using supervised learning with a training set of labeled examples. Each classification corresponds to one or more code constructs. The array of focus words, encoded as word vectors or context-aware tokens, is in a form that is processable by a machine learning model (e.g., deep learning neural network), such as classifier model 132 (FIG. 1).

At this processing juncture, code construct classifier 106 identifies each focus word (e.g., the i-th, j-th element of the n×m matrix) and to determine whether that word can be associated with one or more code constructs or process flows of monolithic computer application 300. The usage of iterative focus words enables code construct classifier 106 (e.g., RNN) to process a connected set of probability distributions with respect to each focus word and determine whether there is a statistical coherence for same. Statistical coherence indicates a likely relationship between words (context-aware tokens) and thus the words comprise a group. The output of code construct classifier 106 (e.g., RNN) for each group of context-aware tokens (focus words) can comprise vector representations—that is, statistically related elements comprising classifiable groups (e.g., key words, table lists for databases (DBs), APIs, and the like) such as K_C1={class: Evidence, Tables list for DB1: $T_1$, $T_2, \ldots, T_n$}, K_C2={class: Verification, Tables list for DB1: $T_x$, $T_y, \ldots, T_m$}, and K_C3={class: Sharing, API List: API 1, API 2, . . . , APIx}, each representing a classification that associates the group with a corresponding code construct. The classification is a statistical coherence derivation representing a numerical value of relevance of a code construct based on the focus words derived from design and process detail documents and other available data (textual input).

An extra dimension can be added to the array, the added dimension measuring time and based on recorded data pertaining to real-time execution of process flows and/or other historical usage data, so that the textual input 306 now converted to an array of numerical values can be arranged in time series. For example, each row of the array can be sequentially segmented into a fixed-length vector, where one dimension corresponds to time. Though not all textual input 306 (e.g., static code analyzer output) has a time dimension, other textual inputs (e.g., process flows, method calls, other historical usage data) do, and it is the time-relevant data that is used in time series analysis.

Invocation sequencer 108, using time-based textual input (e.g., process flow data) represented by time-based context-aware tokens—word vectors having a time dimension—can create time series representations over multiple timelines. Each can correspond to a realization of a stochastic process. The time series representation can transpose the probability of focus word occurrences with associated context words over a predetermined time span. Invocation sequencer 108 can perform time series analysis to identify a context-aware token (e.g., focus word corresponding to the i-th row, j-th column of the n×m matrix) and/or corresponding grouping associated with one or more code constructs of a process flow of the monolithic computer application. Iterative processing of such context-aware tokens and/or corresponding grouping enables a predictor model (e.g., RNN) of recommendation engine 110, such as predictor model 136 (FIG. 1), to process a connected set of probability distributions for context-aware tokens (words) and determine whether there is a statistical coherence with the process flow.

The output of the predictor model of recommendation engine 110 can transpose each time series representation of the connected context-aware tokens (focus words) to determine over a predetermined time span the degree of relevance each has with respect to the realization of the process flow. The transposing of the output (which is a distributed probability score for a word occurring relative to the preceding and succeeding set of words reflected by the linked probability score) spreads the probability score over the predetermine time span, providing a link between the process flow and code constructs being invoked. The intent of the time series representation of all the derived focus words which are linked to processes is to get a map—a kind of "snapshot" of linked context-aware tokens (key topics or focus words linked sequentially or as a branched parallel flow)—that indicates the probability of creating groups or linked sets of clusters representing a set of connected code constructs. The connected code constructs are linked during a temporal space (predetermined time span) for realizing one or more processes of the monolithic computer application. The time-based code constructs represent clusters or invocation sequences that recommendation engine 110 recommends for refactoring the monolithic computer application into microservices. Illustratively, system 100 refactors monolithic computer application 300 based on the invocation sequences, with recommendation engine 110 recommending a refactoring into m microservices 308 (only three of which are shown), which map to m databases 310 (only three of which are shown). The m microservices 308 can perform all the computing functions and operations of the n processes of monolithic computer application 300 and, illustratively, can be accessed via one or more application UIs 312. The code portions generated from the refactoring can be compiled into multiple, executable microservices.

Figure 4:
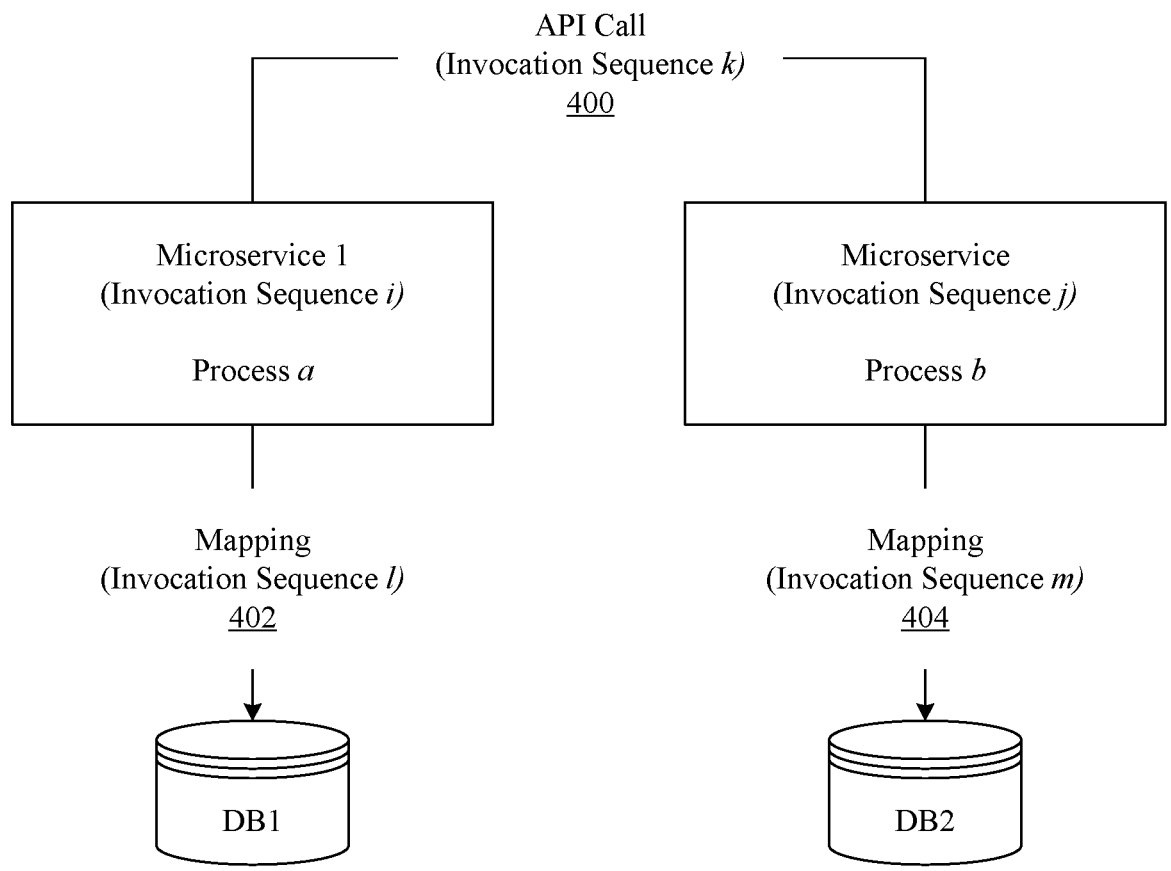
FIG. 4 illustrates certain aspects of refactoring a monolithic computer application by the system of FIG. 1.

With respect to one or more of microservices 308, recommendation engine 110 can also recommend one or more API call flows, system calls, service endpoints, and/or data access controls controlling access to one or more services and/or databases, which can be used by independent microservices. Referring additionally to FIG. 4, recommendation engine 110 recommends API call 400 (implemented by invocation sequence k), which enables microservice 1 (implemented by invocation sequence i corresponding to process a) to call microservice 2 (implemented by invocation sequence j corresponding to process b). Recommendation engine 110 recommends mapping 402 (implemented by invocation sequence l) for mapping microservice 1 to database 1 and mapping 404 (implemented by invocation sequence m) for mapping microservice 2 to database 2.

In certain arrangements, recommendation engine 110 generates for one or more specific processes of monolithic computer application 300 a specific recommendation based on data load and/or data traffic associated with each of the one or more specific processes. Data loads and/or data traffic associated with each of the one or more specific processes can be determined by system 100 from the historical usage data of textual input 306. Optionally, recommendation engine 110 can rank the recommendations based on the data load or data traffic associated with each specific one of the one or more application processes.

In other arrangements, textual input 306 can additionally include one or more preference parameters. A recommendation generated by recommendation engine 110 can be based, at least in part, on the one or more preference parameters. The preference parameters are based on user inputs and direct the processing based on specific focus options of a particular user or for a specific focus. The preference parameters can dictate an emphasis with respect to select focus words and/or phrases, specific process flows, and/or other specific database attributes which are given priority based on the user input. The preference parameters are applied at various stages of processing (with respect to focus word and/or phrases) in the word embedding process to derive the probability score for deriving a word probability matrix. Database attributes and/or tables related to one or more processes of the monolithic computer application can be used in the time series analysis to perform temporal analysis of attributes over enhanced periods and are fed into the recommendation process to create recommendations based on the priorities defined by the preference parameters, enabling recommendation engine 110 to generate, according to user input, customized recommendations based on the user-specified preference parameters.

FIG. 5 illustrates a schematic of an example of a computing node 500. In one or more embodiments, computing node 500 is an example of a suitable cloud computing node. Computing node 500 is not intended to suggest any limitation as to the scope of use or functionality of embodiments of the invention described herein. Computing node 500 is capable of performing any of the functionality described within this disclosure.

Computing node 500 includes a computer system 512, which is operational with numerous other general-purpose or special-purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system-executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors 516, a memory 528, and a bus 518 that couples various system components including memory 528 to processor 516. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 518 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 512 typically includes a variety of computer system-readable media. Such media may be any available media that is accessible by computer system 512, and may include both volatile and non-volatile media, removable and non-removable media.

Memory 528 may include computer system readable media in the form of volatile memory, such as random-access memory (RAM) 530 and/or cache memory 532. Computer system 512 may further include other removable/non-removable, volatile/non-volatile computer system storage media. By way of example, storage system 534 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. For example, one or more of the program modules may include a refactoring and recommendations system, such as system 100, or portions thereof.

Program/utility 540 is executable by processor 516. Program/utility 540 and any data items used, generated, and/or operated upon by computer system 512 are functional data structures that impart functionality when employed by computer system 512. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via input/output (I/O) interfaces 522. Still, computer system 512 can communicate with one or more networks such as a LAN, a WAN, and/or a public network (e.g., the Internet) via network adapter 520. Computer system 512 also can communicate with other devices via a wireless communication subsystem integrated in computing node 500 or operating as a type of external device 514 operatively coupled with computer system 512. The wireless communication subsystem can be designed to operate over one or more mobile networks, Wi-Fi networks, short range wireless networks (e.g., a Bluetooth, UWB), and/or any combination of the foregoing.

As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

While computing node 500 is used to illustrate an example of a computing node, such as a cloud computing node, it should be appreciated that a computer system using an architecture the same as or similar to that described in connection with FIG. 5 may be used in either cloud or non-cloud computing implementations in performing the various operations described herein. In this regard, the example embodiments described herein are not intended to be limited to any single type of computing environment. Computing node 500 is an example of a data processing system. As defined herein, "data processing system" means one or more hardware systems configured to process data, each hardware system including at least one processor programmed to initiate operations and memory.

Computing node 500 is an example of computer hardware. Computing node 500 may include fewer components than shown or additional components not illustrated in FIG. 5 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 500 is also an example of a server (e.g., cloud-based server). As defined herein, "server" means a data processing system configured to share services with one or more other data processing systems and/or devices, including client devices. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
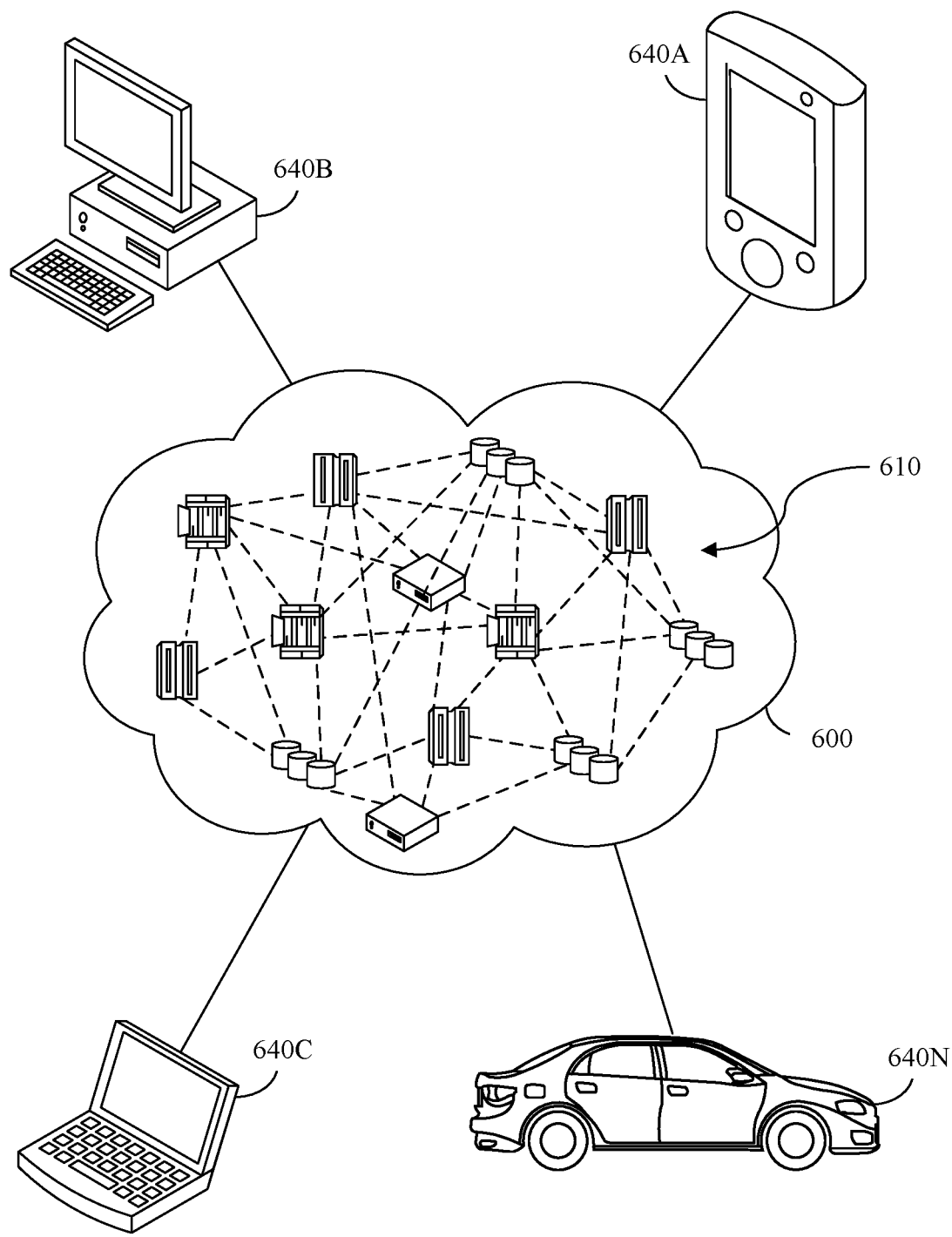
FIG. 6 illustrates an example cloud computing environment.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640a, desktop computer 640b, laptop computer 640c, and/or automobile computer system 640n may communicate. Computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640a-n shown in FIG. 6 are intended to be illustrative only and that computing nodes 610 and cloud computing environment 600 can communicate with any type of computerized device over any type of network and/or network addressable connection (e.g., using a web browser).

Figure 7:
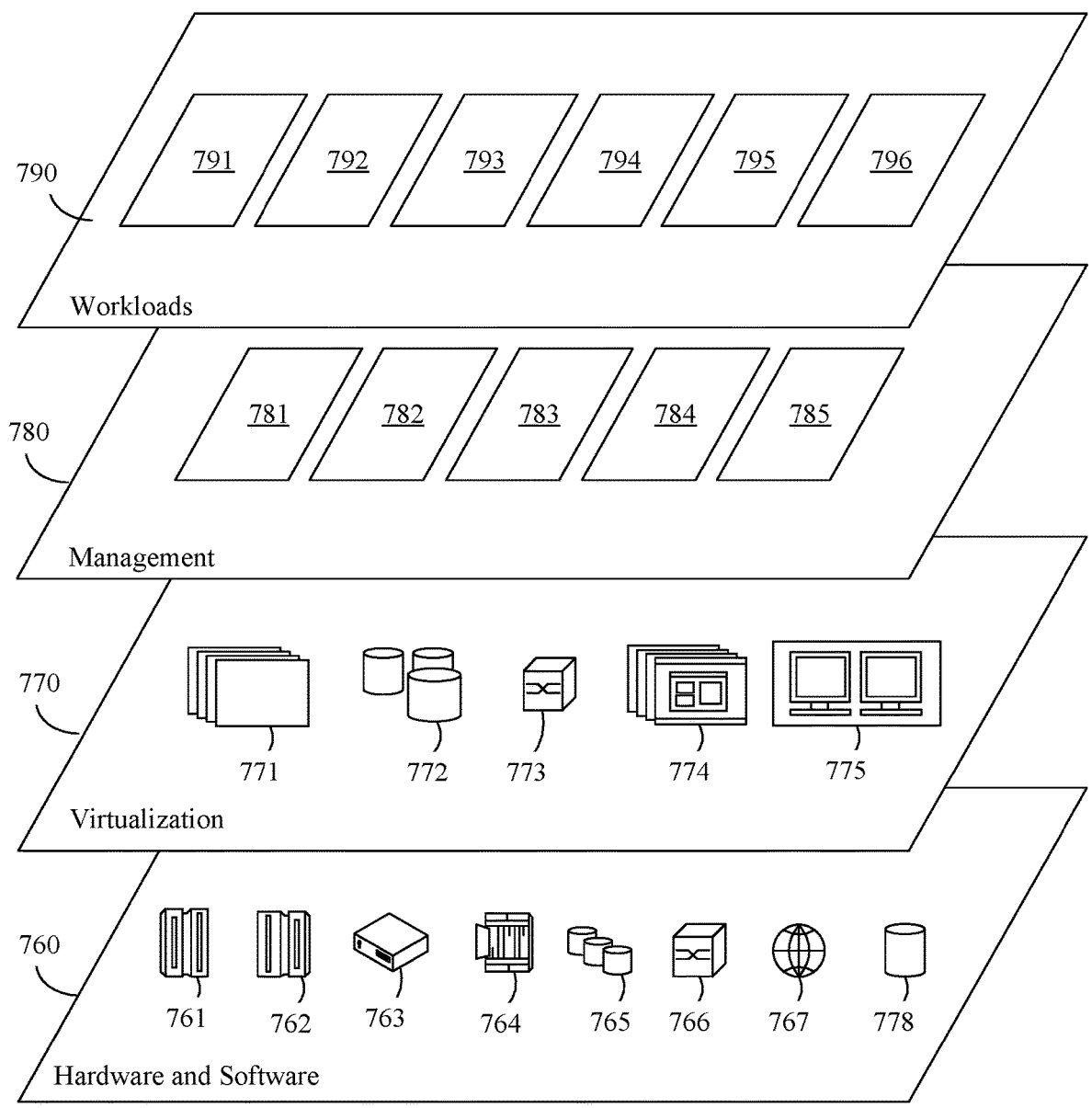
FIG. 7 illustrates example abstraction model layers.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and refactoring and recommendation system 796.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user," "individual," "engineer," and "programmer" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
transforming textual input into a plurality of context-aware tokens represented by machine-processable data structures, wherein the textual input is acquired from multiple sources of text associated with a computer application having a monolithic architecture for implementing one or more application processes;
determining, using computer hardware, one or more groupings of context-aware tokens based on co-occurrence frequencies among the context aware tokens;
determining, using the computer hardware, an association between each of the one or more groupings and one or more code constructs;
generating invocation sequences based on time series of computer-generated usage data generated in response to execution of the one or more application processes, wherein each invocation sequence links two or more code constructs based on a time series linking groupings that correspond to the two or more code constructs; and
generating a recommendation for refactoring the computer application into a plurality of microservices, wherein each microservice corresponds to one or more invocation sequences.

2. The method of claim 1, wherein
the multiple sources of text include at least one of a set of process flow documents, source code of the computer application, code analyzer output, historical usage data, or database mapping.

3. The method of claim 1, wherein
the generating the recommendation comprises recommending one or more of API call flows between two or more microservices, data access controls for one or more of the microservices, and/or service endpoints for one or more of the microservices.

4. The method of claim 1, wherein
the generating the recommendation comprises generating multiple recommendations that each correspond to a specific one of the one or more application processes.

5. The method of claim 4, comprising:
ranking each of the multiple recommendations, wherein the rankings are based on data load or data traffic associated with each specific one of the one or more application processes.

6. The method of claim 1, wherein
the textual input includes a preference parameter, the generating the recommendation based at least in part upon the preference parameter.

7. The method of claim 1, wherein
the determining the association includes classifying the one or more groupings using a deep learning neural network.

8. A system, comprising:
a processor configured to initiate operations including:
transforming textual input into a plurality of context-aware tokens represented by machine-processable data structures, wherein the textual input is acquired from multiple sources of text associated with a computer application having a monolithic architecture for implementing one or more application processes;
determining, using computer hardware, one or more groupings of context-aware tokens based on co-occurrence frequencies among the context aware tokens;
determining, using the computer hardware, an association between each of the one or more groupings and one or more code constructs;
generating invocation sequences based on time series of computer-generated usage data generated in response to execution of the one or more application processes, wherein each invocation sequence links two or more code constructs based on a time series linking groupings that correspond to the two or more code constructs; and
generating a recommendation for refactoring the computer application into a plurality of microservices, wherein each microservice corresponds to one or more invocation sequences.

9. The system of claim 8, wherein
the multiple sources of text include at least one of a set of process flow documents, source code of the computer application, code analyzer output, historical usage data, or database mapping.

10. The system of claim 8, wherein
the generating the recommendation comprises recommending one or more of API call flows between two or more microservices, data access controls for one or more of the microservices, and/or service endpoints for one or more of the microservices.

11. The system of claim 8, wherein
the generating the recommendation comprises generating multiple recommendations that each correspond to a specific one of the one or more application processes.

12. The system of claim 11, wherein the processor is configured to initiate operations further including:
ranking each of the multiple recommendations, wherein the rankings are based on data load or data traffic associated with each specific one of the one or more application processes.

13. The system of claim 8, wherein
the textual input includes a preference parameter, the generating the recommendation based at least in part upon the preference parameter.

14. A computer program product, the computer program product comprising:
one or more computer-readable storage media and program instructions collectively stored on the one or more computer-readable storage media, the program instructions executable by a processor to cause the processor to initiate operations including:
transforming textual input into a plurality of context-aware tokens represented by machine-processable data structures, wherein the textual input is acquired from multiple sources of text associated with a computer application having a monolithic architecture for implementing one or more application processes;
determining, using computer hardware, one or more groupings of context-aware tokens based on co-occurrence frequencies among the context aware tokens;
determining, using the computer hardware, an association between each of the one or more groupings and one or more code constructs;
generating invocation sequences based on time series of computer-generated usage data generated in response to execution of the one or more application processes, wherein each invocation sequence links two or more code constructs based on a time series linking groupings that correspond to the two or more code constructs; and
generating a recommendation for refactoring the computer application into a plurality of microservices, wherein each microservice corresponds to one or more invocation sequences.

15. The computer program product of claim 14, wherein the multiple sources of text include at least one of a set of process flow documents, source code of the computer application, code analyzer output, historical usage data, or database mapping.

16. The computer program product of claim 14, wherein the generating the recommendation comprises recommending one or more of API call flows between two or more microservices, data access controls for one or more of the microservices, and/or service endpoints for one or more of the microservices.

17. The computer program product of claim 14, wherein the generating the recommendation comprises generating multiple recommendations that each correspond to a specific one of the one or more application processes.

18. The computer program product of claim 17, wherein the program instructions are executable by the processor to cause the processor to initiate operations further including:
ranking each of the multiple recommendations, wherein the rankings are based on data load or data traffic associated with each specific one of the one or more application processes.

19. The computer program product of claim 14, wherein the textual input includes a preference parameter, the generating the recommendation based at least in part upon the preference parameter.

20. The computer program product of claim 14, wherein the determining the association includes classifying the one or more groupings using a deep learning neural network.

* * * * *